(12) United States Patent
Chen et al.

(10) Patent No.: US 9,648,491 B2
(45) Date of Patent: May 9, 2017

(54) METHOD OF SELECTING AN ACTIVE SIM FROM MULTIPLE SIMS AND A WIRELESS DEVICE UTILIZING THE SAME

(71) Applicant: MediaTek Inc., Hsin-Chu (TW)

(72) Inventors: Yu-Ting Chen, Meishan Township, Chiayi County (TW); Yi-Ting Cheng, Taipei (TW); Pei-Shiuan Ho, Taichung (TW); Hsiao-Yun Tseng, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 4 days.

(21) Appl. No.: 14/183,652

(22) Filed: Feb. 19, 2014

(65) Prior Publication Data

US 2015/0237497 A1 Aug. 20, 2015

(51) Int. Cl.
*H04M 1/00* (2006.01)
*H04W 8/18* (2009.01)
*H04W 88/06* (2009.01)
*H04W 88/18* (2009.01)

(52) U.S. Cl.
CPC ............ *H04W 8/183* (2013.01); *H04W 88/06* (2013.01); *H04W 88/18* (2013.01)

(58) Field of Classification Search
CPC ..... H04W 88/06; H04W 48/18; H04W 8/183; H04W 8/18; H04W 76/048; H04W 76/025; H04W 68/00; H04W 4/16; H04W 76/022; H04W 8/24; H04W 60/005; H04W 72/1215; H04W 36/14; H04W 76/026; H04L 5/14; H04L 12/1457; H04L 12/1475; H04L 12/4633; H04L 12/587; H04L 12/5895; H04L 51/24; H04L 12/1425; H04L 12/1464; H04L 12/1467; H04L 1/0036
See application file for complete search history.

(56) References Cited

U.S. PATENT DOCUMENTS

| | | | |
|---|---|---|---|
| 2013/0237197 A1* | 9/2013 | Ruvalcaba ............ | H04W 8/183 455/418 |
| 2014/0080485 A1* | 3/2014 | Park ...................... | H04W 36/14 455/436 |
| 2014/0120859 A1* | 5/2014 | Ekici et al. ................ | 455/404.1 |
| 2014/0155119 A1* | 6/2014 | Bishop et al. ............. | 455/552.1 |
| 2014/0256302 A1* | 9/2014 | Chirayil ........................ | 455/418 |
| 2015/0094071 A1* | 4/2015 | Hang et al. .................... | 455/450 |

* cited by examiner

*Primary Examiner* — Golam Sorowar
(74) *Attorney, Agent, or Firm* — McClure, Qualey & Rodack, LLP

(57) ABSTRACT

A method of selecting an active SIM from multiple SIMs and a wireless device utilizing the same are disclosed. The method includes: acquiring SIM information associated with each SIM under a dynamic environment, wherein each SIM provides for the PS data service; calculating a SIM score of each SIM based on the acquired SIM information associated with each SIM; and selecting the active SIM based on all SIM scores to provide for the PS data service. The SIM information includes RSSI, RSCP, Ec/N0, CQI, and data speed on each SIM in the dynamic environment.

20 Claims, 15 Drawing Sheets

METHOD OF SELECTING AN ACTIVE SIM FROM MULTIPLE SIMS AND A WIRELESS DEVICE UTILIZING THE SAME

BACKGROUND OF THE INVENTION

Field of the Invention

The present invention relates to telecommunications, and in particular relates to a method of selecting an active SIM from multiple SIMs and a wireless device utilizing the same.

Description of the Related Art

A multi-SIM (subscriber identity module) wireless device, including particularly mobile phones, personal digital assistants, tablet and laptop computers, mobile WiFi router and mobile USB dongle can hold two or more SIM cards. Each SIM card contains a unique international mobile subscriber identity (IMSI) and the related key which allow a user to be identified and authenticated by a service provider. Hereinafter "SIM" and "SIM card" will be used interchangeably. The multi-SIM wireless device allows a user to operate with a corresponding number of communications networks and/or arrangements without the need to carry two or more wireless devices.

Packet Switched (PS) communications service is delivery of data stream in form of sequences of packets. With growth of PS communications services, an increasing number of the multi-SIM wireless devices are equipped with multiple SIMs which subscribe to PS networks. For example, the same mobile phone can be used for business and private uses with separate numbers and bills on the same or different PS networks. In another example, the same mobile phone is used for travel, with one SIM being used in the home town and the other SIM being used in the place visited, provided by the same or different PS network operators. As another example, both SIMs may be used with the same PS network, for example, to increase a total bandwidth of data transfers on the mobile phone. In general, using multiple SIMs allows the user to take advantage of different pricing plans for PS data services to certain destinations, and/or to keep personal and business uses separate, and/or to achieve higher bandwidth, and/or to obtain coverage across different PS networks using the same mobile phone.

Because the multi-SIM wireless device contains multiple SIMs, a method of automatic SIM selection for a multi-SIM device is required.

BRIEF SUMMARY OF THE INVENTION

A detailed description is given in the following embodiments with reference to the accompanying drawings.

A method adopted by a wireless device to select an active subscriber identity module (SIM) from a plurality of SIMs which provide for packet switched (PS) data services is disclosed, the method comprising: acquiring SIM information associated with each SIM which provides for the PS data service; calculating a SIM score of each SIM based on the acquired SIM information associated with each SIM; and selecting the active SIM based on all SIM scores to provide for the PS data service.

Another embodiment of a wireless device is provided, selecting an active SIM from a plurality of SIMs which provide for PS data services, comprising the plurality of SIMs, a modem circuit and a select circuit. The modem circuit is configured to acquire SIM information associated with each SIM under a dynamic environment, wherein each SIM provides for the PS data service. The select circuit is configured to calculate a SIM score of each SIM based on the acquired SIM information associated with each SIM, and select the active SIM based on all SIM scores to provide for the PS data service. The SIM information includes RSSI, RSCP, Ec/N0, CQI, and data speed on each SIM in the dynamic environment.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various aspects are described herein in connection with a wireless terminal, which can also be referred to as a system, device, subscriber unit, subscriber station, mobile station, mobile, mobile device, remote station, remote terminal, access terminal, user terminal, terminal, communication device, wireless device, portable communication device, wireless communication device, user agent, user device, or user equipment (UE). The wireless terminal may be a cellular telephone, a satellite phone, a cordless telephone, a Session Initiation Protocol (SIP) phone, Personal Digital Assistant (PDA), a handheld device having wireless connection capability, a computing device, or other processing device connected to a wireless modem. Moreover, a base station described herein may be utilized for communicating with wireless terminal(s) and may also be referred to as an access point, a node B, or an evolved node B (eNB).

The techniques described herein may be used for various packet switched (PS) based communications systems supporting General packet radio service (GPRS), Enhanced Data rates for GSM Evolution (EDGE), Universal Mobile Telecommunications System (UMTS), Code Division Multiple Access 2000 (CDMA2000), Enhanced Voice-Data Optimized (EVDO), High Speed Packet Access (HSPA), HSPA plus (HSPA+), Time Division-Synchronous Code Division Multiple Access (TD-SCDMA), Worldwide Interoperability for Microwave Access (WiMAX), Long Term Evolution (LTE), LTE-Advanced (LTE-A), or other PS-based communication techniques.

A subscriber identity module (SIM) card referred herein may be a universal SIM (USIM) card for Wideband Code Division Multiple Access (W-CDMA) or Time Division-Synchronous Code Division Multiple Access (TD-SCDMA) system, a removable User Identity Module (R-UIM) or a Code Division Multiple Access (CDMA) Subscriber Identity Module (CSIM) card for a CDMA2000 system. The SIM card contains an international mobile subscriber identity (IMSI) and a related key used to identify and authenticate subscribers on a mobile station (MS). The mobile station is immediately programmed after the SIM card(s) are plugged therein. The SIM cards may also be programmed to display custom menus for personalized services.

The embodiments described herein utilize a Dual-SIM configuration of a wireless device, which allows the use of two data services on one device. The scope of the invention, however, is not limited to a Dual-SIM device, and can be extended to a multi-SIM device, based on the principles outlined in the disclosure.

Figure 1:
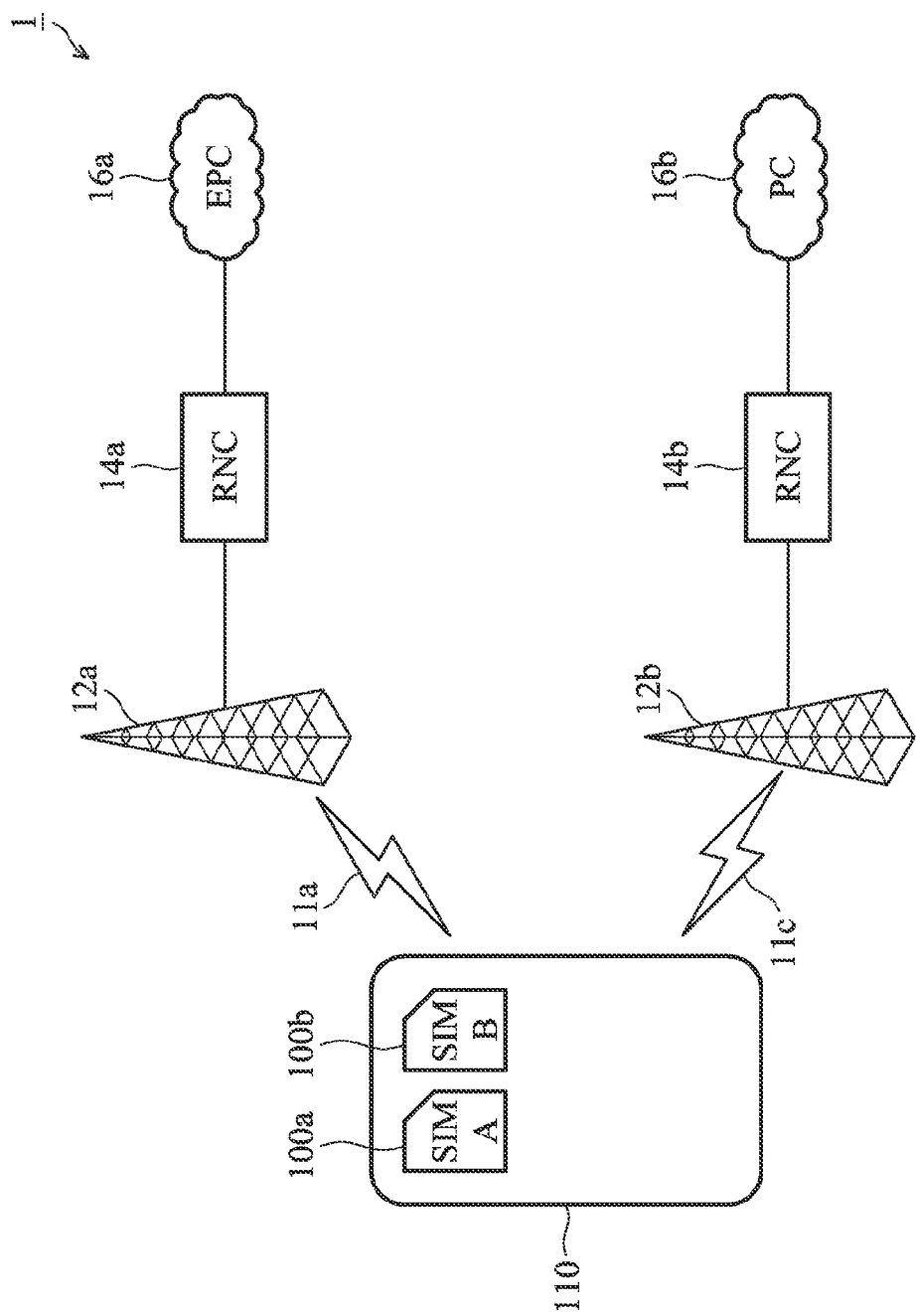
FIG. 1 illustrates a schematic diagram of a mobile communications system 1.

FIG. 1 illustrates a schematic diagram of a mobile communications system 1, incorporating a dual-SIM wireless device 110 (wireless device) which carries two subscriber identity module (SIM) cards 100a and 100b simultaneously to access the same or different PS-based networks after camping on cells. The mobile communications system 1 contains base stations 12a and 12b, Radio Network Controllers (RNC) 14a and 14b, an Evolved Packet Core (EPC) 16a and another packet core 16b, in which the base station 12a, the RNC 14a and the EPC 16a belong to an LTE network, and the base station 12b, the RNC 14b and the other PC 16b belong to another PS network. The two SIM cards 100a and 100b which are employed by the wireless device 110 may be a SIM, USIM, R-UIM, CSIM, or other types of SIM card subscribed to PS networks. In the embodiment, the SIM 100a subscribes to the LTE network and the SIM 100b subscribes to the other PS-based network.

In operation, when the wireless device 110 moves from place to place or when a radio environment changes, the wireless device 110 can automatically select one or more active SIMs which provide satisfactory data traffic conditions, and access PS data services on the selected one or more active SIMs. Specifically, the wireless device 110 can select the active SIMs based on SIM information. The SIM information may be a user specified constraint such as a SIM priority, a transmission quota, or an operating status such as enablement and disablement associated with each SIM. The SIM information may also be a dynamic information associated with each SIM, including a received signal strength indicator (RSSI), a received signal code power (RSCP), a ratio of the energy per chip to the noise power density (Ec/N0), signal to noise ratio (SNR), radio resources such as a reception channel quality indicator (RX CQI) and transmission grants (TX grant) that provided by network, device SIM capability information such as communication specifications and protocols supported by the wireless device 110, and cell broadcast information such as communication specifications and protocols supported by the PS networks.

The wireless device 110 can calculate a SIM score for each SIM based on one or more SIM information, select the active SIM based on the SIM scores, and perform the PS data service on the selected active SIMs. Furthermore, the wireless device 110 can separately calculate an active SIM score and an inactive SIM score for each SIM, respectively representing measures on how suitable and how unsuitable the SIM card is for use in the PS data communications. When a SIM card is selected as an inactive SIM, it will remain in an idle state without being engaged in obtaining any data service. In some embodiments, the active SIM score and inactive SIM score may be computed by different criteria, e.g., by different score formulas. For example, the active SIM score $S_{act}$ may be computed by Expression [1], the inactive SIM score $S_{inact}$ may be computed by Expression [2]:

$$S_{act}=\text{Enable}\times(10-\text{Priority})\times(\text{signal quality})\times(\text{highest data speed}+\text{current data speed}) \quad [1]$$

$$S_{inact}=\text{Enable}\times(10-\text{Priority})\times(\text{signal quality})\times(\text{highest data speed}) \quad [2]$$

Where (Enable) represents a SIM card enablement option;
(Priority) represents a priority assigned to a SIM card;
(Signal quality) represents a signal quality measured in a cell;
(highest data speed) represents a highest data speed measured in a period of time; and
(current data speed) represents a current data speed.

From Expressions [1] and [2], it can be observed that the active SIM score $S_{act}$ is likely to exceed the inactive SIM score $S_{inact}$ because of the extra (current data speed) term. The wireless device 110 may compare the active SIM score $S_{act}$ and the inactive SIM score $S_{inact}$ to different thresholds, such that a SIM card that has already been selected as an active SIM will be less likely to be switched back as inactive. Consequently there will be decreased switching back and forth between the active and inactive SIM status. Expressions [1] and [2] are merely examples, but not a limitation for calculating the active and inactive SIM scores for a SIM, those skilled in the art may use other expressions or formulas based on the SIM information to estimate the SIM scores.

Moreover, in order to prevent the SIMs from being frequently switched between the two SIM statuses, the wireless device 110 may adopt a SIM selection timer to count a predefined time interval $T_B$, and perform the SIM selection only on timer expiry. For example, the wireless device 110 may configure the SIM selection timer to be expired after 10 seconds, so that the SIM selection may be carried out once every 10 seconds.

The wireless device 110 may be a Dual-SIM Dual Standby (DSDS) or a Dual-SIM Full Active (DSFA) device. Dual-SIM Dual Standby is a feature which allows two SIMs to be on standby waiting for a call. When one call is established on one SIM, the other SIM is no longer active. Callers to the other SIM will hear a message that the phone is switched off or they will be redirected to a voicemail.

Dual-SIM Full Active, also known as Dual Call or Dual talk, is a feature which allows the wireless device 110 to be connected to both PS networks concurrently. The wireless device 110 can switch between two calls without dropping either, so while a user is on a call he or she can still receive calls on the other number. The Dual-SIM Full Active device 110 has two transceivers. Both SIMs are able to receive calls, once active call on one SIM is established, a call can still be received on the other SIM. A user may switch between two calls without disconnecting any of them. In instances of adopting Dual-SIM Dual Standby feature, the wireless device 110 can use multiple SIMs with different pricing plans, for different purposes such as business and private uses, in different places such as a local place and an out-of-town place, to provide a smoother data transmission by the automatic SIM selection mechanism according to the embodiments of the invention. In instances of adopting Dual-SIM Full Active feature, the wireless device 110 can boost the data transmission speed by using both SIMs based on the automatic SIM selection mechanism according to the embodiment of the invention.

The data services requested on the selected active SIMs are PS data services which include data transfers, internet protocol (IP) based calls and other PS-based applications. For example, the PS data services can be a YouTube video, a BitTorrent data upload/download, or an IP Multimedia Subsystem (IMS) call. For example, when a Dual-SIM Dual Standby device 110 moves while playing a YouTube video, the Dual-SIM Dual Standby device 110 may download the YouTube video on the SIM 100a, and automatically switch to the other SIM 100b to continue the YouTube video download as the Dual-SIM Dual Standby device 110 moves out from the radio coverage of the SIM 100a and into the radio coverage of the SIM 100b. In another example, the SIM 100a and 100b of a Dual-SIM Full Active device 110 may be concurrently engaged to download a file from a remote file server, increasing the data transfer bandwidth and the download speed when the data traffic condition is allowed. In yet another example, the Dual-SIM Full Active device 110 can support two data sessions via both SIMs concurrently, allowing, for example, the SIM 100a to be engaged in an IMS call session and the other SIM 100b to be simultaneously engaged in a data download session.

The wireless device 110 employs a select module to select active SIMs based on various SIM information for receiving the PS data services. Please refer to FIG. 2 for a block diagram of an exemplary wireless device 10 according to an embodiment of the invention. The wireless device 10 contains hardware circuit components and firmware/software codes to provide the automatic SIM selection functionality, including two SIM cards SIM A and SIM B, antennas 26a and 26b, RF circuits 24a and 24b, baseband processor 22, and a memory device 20 which contains codes and instructions of a select module 200, an application module 202, and modem modules 204 and 206.

The SIM A and SIM B, the RF circuits 24a and 24b are connected to the baseband processor 22. The RF circuits 24a and 24b are respectively configured to provide signal processing of the RF signals received and sent via the antennas 26a and 26b and the SIM connections corresponding to the SIM A and the SIM B. When executed, the select module 200, the application module 202, and the modem modules 204 and 206 in the memory 20, will cause the baseband processor 22 to execute the codes and instructions therein, and perform steps and functions of selecting an active SIM and/or an inactive SIM, an application program, and specific functions concerning with modem operations, respectively.

Specifically, the antenna 26a, the RF circuit 24a and the modem module 204 are configured to process the data for a SIM connection established based on SIM A, whereas the antenna 26b, the RF circuit 24b and the modem module 206 are configured to process the data for a SIM connection established based on SIM B. The modem modules 204 and 206 and the select module 200 may be implemented as firmware or software, performing various modem operations and functions for data connections based on SIM A and SIM B, respectively, when being loaded and executed by the baseband processor 22. The select module 200, implemented by firmware or software, communicates and interacts with the modem modules 204 and 206 and carries out the automatic SIM selection procedure according to the embodiment of the invention, when being loaded and executed by the baseband processor 22. The application module 202, implemented by software, communicates and interacts with the select module 200 and performs application programs such as a user interface which prompts the user to enter a SIM card priority setting.

Figure 3A:
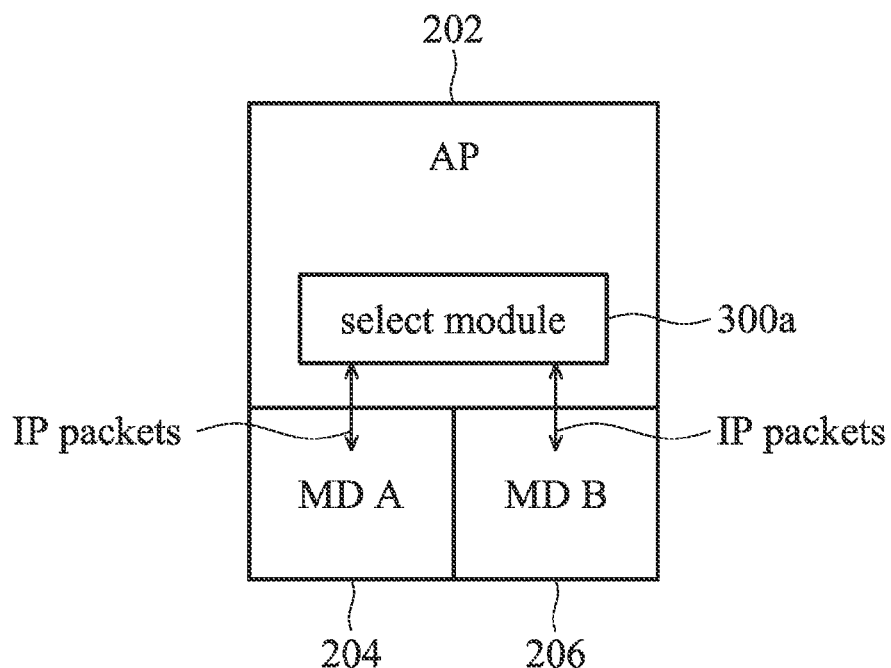
FIGS. 3A and 3B depicts three implementations of the select module according to various embodiments of the invention.
Figure 3B:
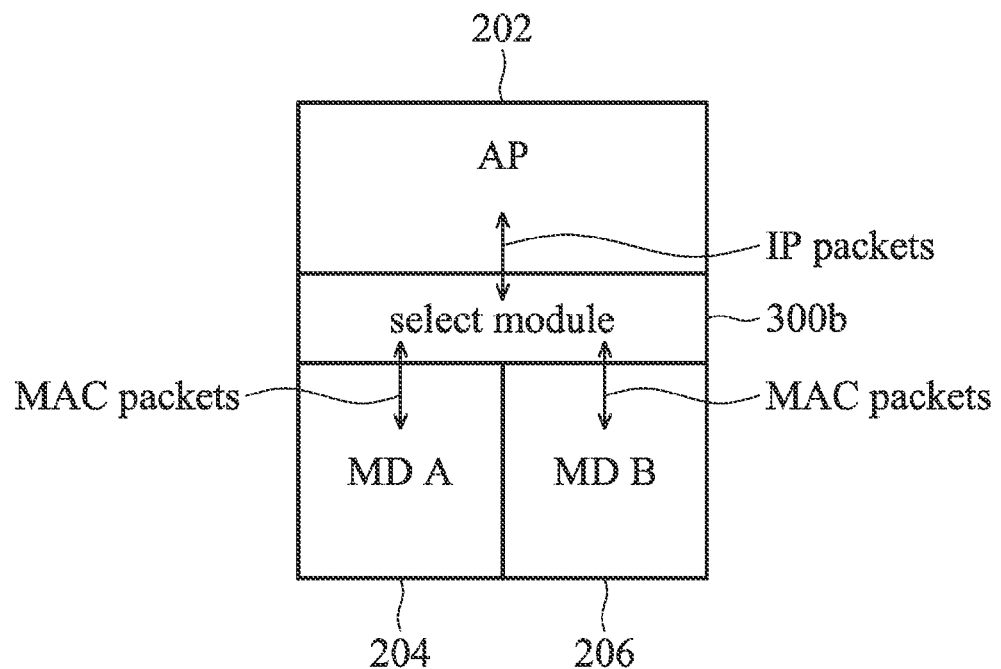

The configurations and arrangements of the select module, the modem modules 204 and 206 and the application module 202 can be embodied in three forms as depicted in FIGS. 3A and 3B. Please firstly refer to FIG. 3A, the select module 300a resides in the application module 202, communicates with the modem modules 204 and 206 in Internet Protocol (IP), and exchanges the PS data with the modem modules 204 and 206 by IP packets. In particular, the select module 300a may be configured to communicate with the modem modules 204 and/or 206 by the type of applications requested by the application module 202. For example, the application module 202 may request to run a YouTube application and a BitTorrent application, and the select module 300a may select both SIM as being active, assign the data associated with the YouTube application to the modem module 204, and assign the data associated with the BitTorrent application to the modem module 206. As a result, the data of the two applications may be concurrently accessed on SIM A and SIM B. In another example, the application module 202 requires making a Skype call, and the select module 300a may select only one active SIM based on the SIM information, and assign the data transfer associated with the Skype call to the modem module corresponding to the selected active SIM.

FIG. 3B shows another configuration of the select module 300b, where the select module 300b resides between the application module 202 and the modem modules 204 and 206. The select module 300b communicates to the application module 202 with the IP packets and to the modem modules 204 and 206 with media access control (MAC) packets. In instance of the Dual-SIM Dual-Standby, the select module 300b can receive the SIM information from the modem modules 204 and 206, and determine an active SIM from the modem modules 204 and 206 based on the SIM information, then inform the application module 202 of the selected active SIM so that the application module 202 can adopt an IP of the active SIM as an application socket binding IP.

Figure 2:
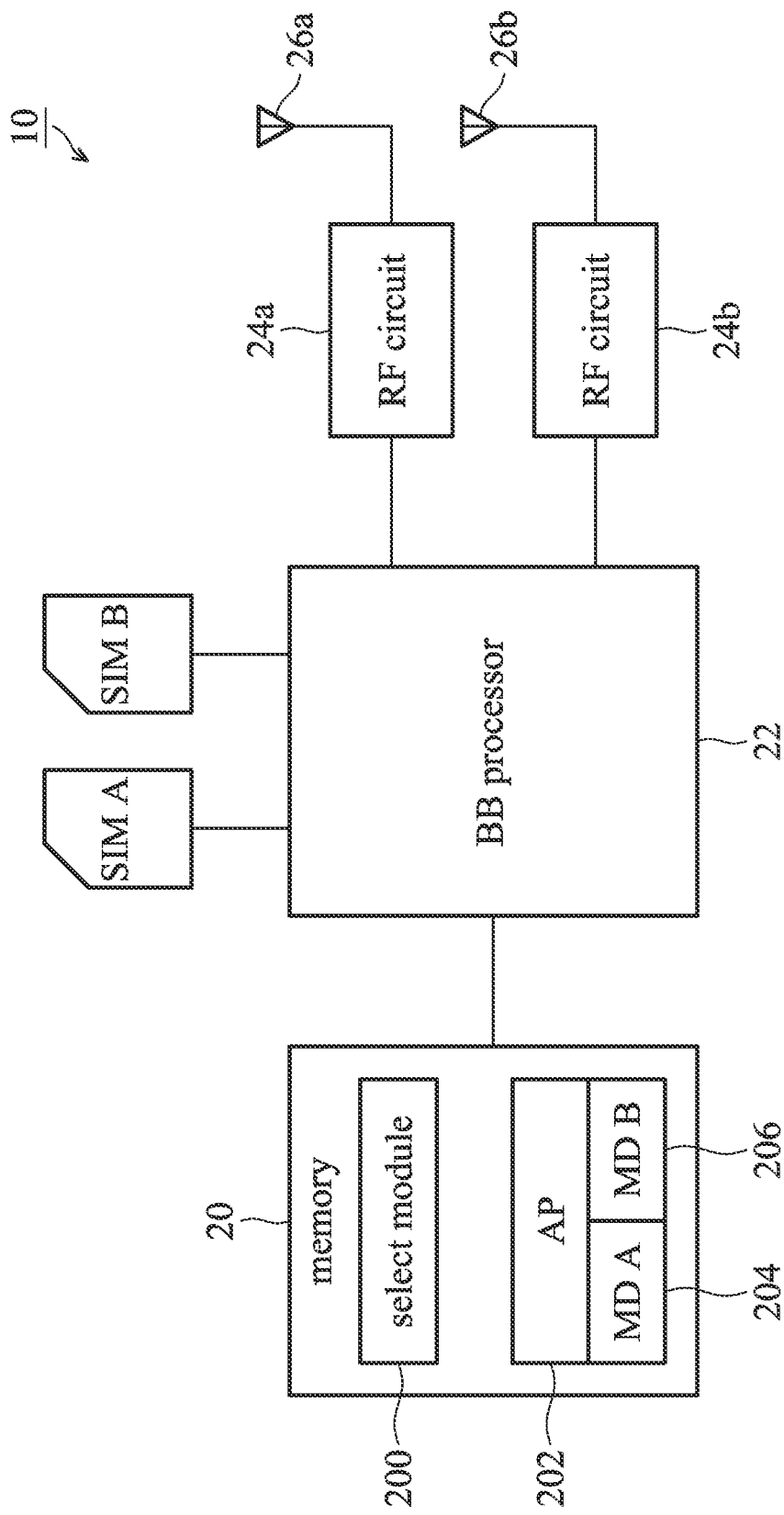
FIG. 2 is a block diagram of a wireless device 10 according to an embodiment of the invention.

Although embodiments in FIGS. 2, 3A and 3B adopt software or firmware to implement the modem module, those skilled in the art would recognize that the modem module may also be implemented by a hardware circuit.

Figure 4:
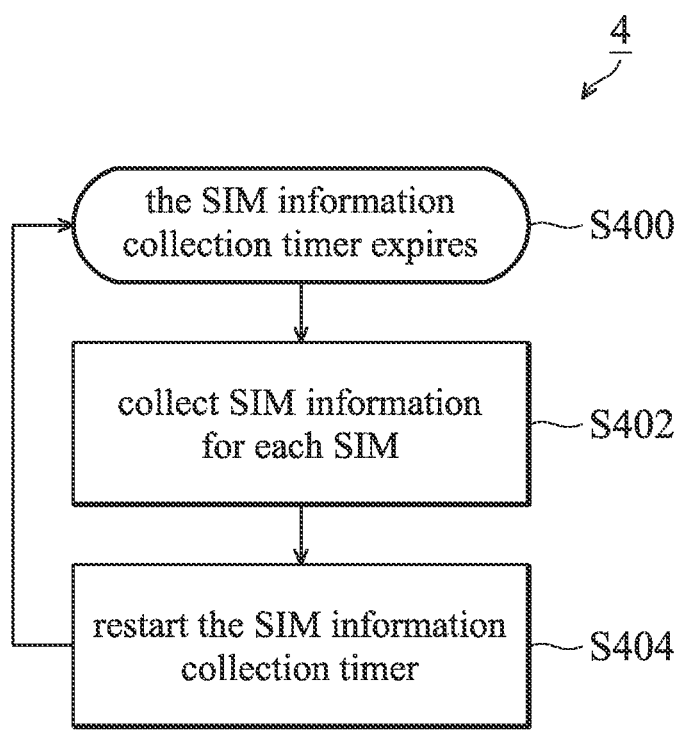
FIG. 4 is a flowchart of a collection method 4, collecting SIM information according to an embodiment of the invention.

FIG. 4 is a flowchart of a SIM collection method 4, collecting SIM information according to an embodiment of the invention, incorporating the wireless device 10 in FIG. 2.

In order to perform the automatic SIM selection method, the wireless device 10 is configured to collect SIM information for each SIM on the wireless device 10. The wireless device 10 contains a SIM information collection timer (not shown) to count a predefined time interval $T_A$. Upon expiry of the SIM information collection timer (S400), the modem modules MD A 204 and MD B 206 are configured to acquire SIM information by conducting measurements such as the RSSI, RSCP, Ec/N0, CQI, and data speed on each SIM connection, obtaining the user specified constraints such as the SIM priority, transmission quota, and operating status associated with each SIM, and receiving other information such as the transmission grants, device SIM capability information, and cell broadcast information (S402). The modem modules MD A 204 and MD B 206 then send the acquired SIM information for each SIM to the select module 200 to decide which SIM(s) are to be adopted as active SIM(s) for acquiring PS data service. The SIM information collection timer is reset to count the predefined time interval $T_A$ again (S404) and the SIM collection method 4 is completed and exited.

Figure 5:
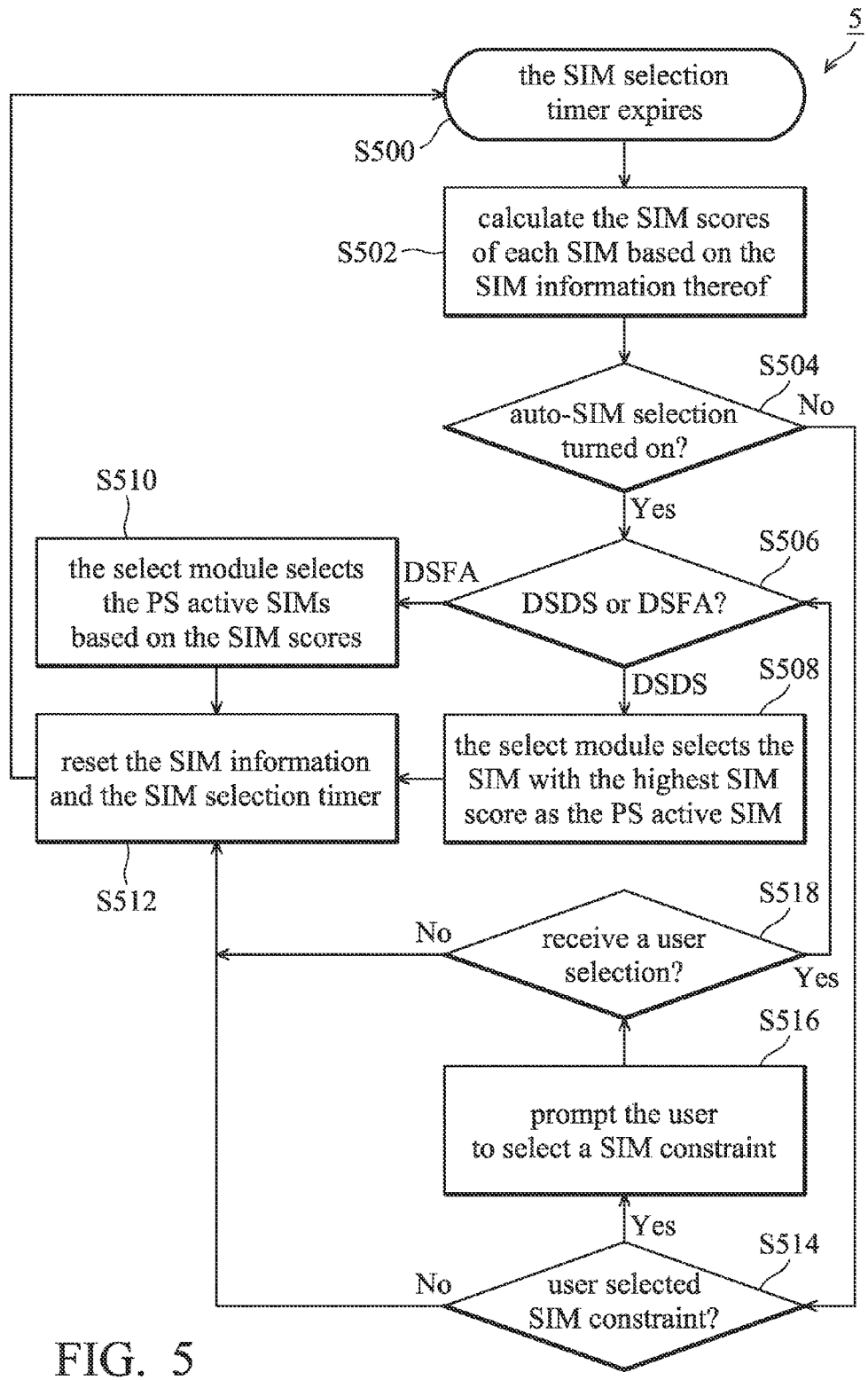
FIG. 5 is a flowchart of a selection method 5, selecting active SIM(s) from all available SIMs according to an embodiment of the invention.

Now turn to FIG. 5, which illustrates a flowchart of a SIM selection method 5, selecting active SIM(s) from all available SIMs according to an embodiment of the invention, incorporating the wireless device 10 in FIG. 2. The SIM selection method 5 is used in conjunction with the SIM collection method 4 to provide the automatic SIM selection mechanism adopted by the wireless device 10.

As previously discussed, the wireless device 10 contains a SIM selection timer (not shown) to count the predefined time interval $T_B$. Upon expiry of the SIM selection timer (S500), the select module 200 is configured to calculate the SIM scores of the SIM A and SIM B based on the SIM information received from the MD A 204 and MD B 206 (S502). It is worth noting that the predefined time interval $T_B$ of the SIM selection timer exceeds the predefined time interval $T_A$ of the SIM collection timer, so that the wireless device 10 collects the SIM information more frequently than making a SIM selection. When the predefined time interval $T_B$ of the SIM selection timer is set longer, the wireless device 10 may switch the active SIM less frequently, and the SIM switching overhead which refers to the radio resources and power consumed during the setup of switching to an active SIM may decrease. When the predefined time interval $T_B$ of the SIM selection timer is set shorter, the wireless device 10 may switch the active SIM more frequently, and the SIM switching may be more responsive to a radio environment change. The SIM score of each SIM is computed by the select module 200, and may contain the active SIM score and the inactive SIM score estimated by different criteria and calculated by different formulas, to further control the SIM switching frequency.

Next in Step S504, the select module 200 is configured to determine whether to initiate the automatic SIM selection mechanism by checking an automatic SIM selection option and/or a data traffic condition of the present active SIM. For example, when the automatic SIM selection option is turned on and the present active SIM is out-of-service due to data traffic condition degradation, the wireless device 10 can initiate the automatic SIM selection mechanism, otherwise the SIM selection method 5 goes to Step S514.

Upon startup of the automatic SIM selection, the select module 200 determines whether the wireless device 10 operates in the Dual-SIM Dual Standby or Dual-SIM Full Active mode (S506). When the wireless operates in the Dual-SIM Dual Standby mode, the select module 200 will select only one active SIM among all available SIMs based on all SIM information. More specifically, the select module 200 is configured to select the SIM with the highest active SIM score as the active SIM for accessing the PS services (S508). When the wireless operates in the Dual-SIM Full Active, the select module 200 may select one or more active SIMs among all available SIMs based on all SIM information. In particular, the select module 200 is configured to select all SIM(s) with the active SIM scores exceeding an active SIM threshold as the active SIM(s) (S510).

After the active SIM is selected, the select module 200 can reset the SIM information of all SIMs and the SIM selection timer, preparing for the next round of SIM selection (S512). The SIM selection method 5 returns to Step S500, waiting the SIM selection timer to expire and restart the automatic SIM selection method 5.

When the wireless device 10 is not required to start the automatic SIM selection mechanism, the select module 200 is configured to set up a SIM card configuration by firstly determining whether a user selected SIM constraint option is turned on (S514). If not, the user is not required or permitted to change the SIM card configuration, thus the SIM selection method 5 goes to Step S512, where the select module 200 is configured to reset all SIM information and the SIM selection timer, completing the present SIM selection and preparing for the next SIM selection operation user selected SIM constraint option is on, a SIM card configuration menu will prompt on screen, indicating the user to input or enter SIM configuration such as the priorities and the operating status of each SIM.

The select module 200 then determines whether a user selection of the SIM configuration is input or entered by the user (S518). If it is so, the select module 200 is configured to update the user selection to the SIM configuration and proceed to the automatic SIM selection in Step S506 with the updated SIM configuration. If the select module 200 does not receive any input from the user in certain period of time, the automatic SIM selection method 5 may go to Step S512 to reset all SIM information and the SIM selection timer, and the automatic SIM selection method 5 is completed.

The automatic SIM selection method 5 in FIG. 5 allows the wireless device 10 to automatically select an active SIM according to the SIM information of the SIMs, providing an increased user experience in the PS data service while being able to boosting the data speed of the PS data service.

Figure 6:
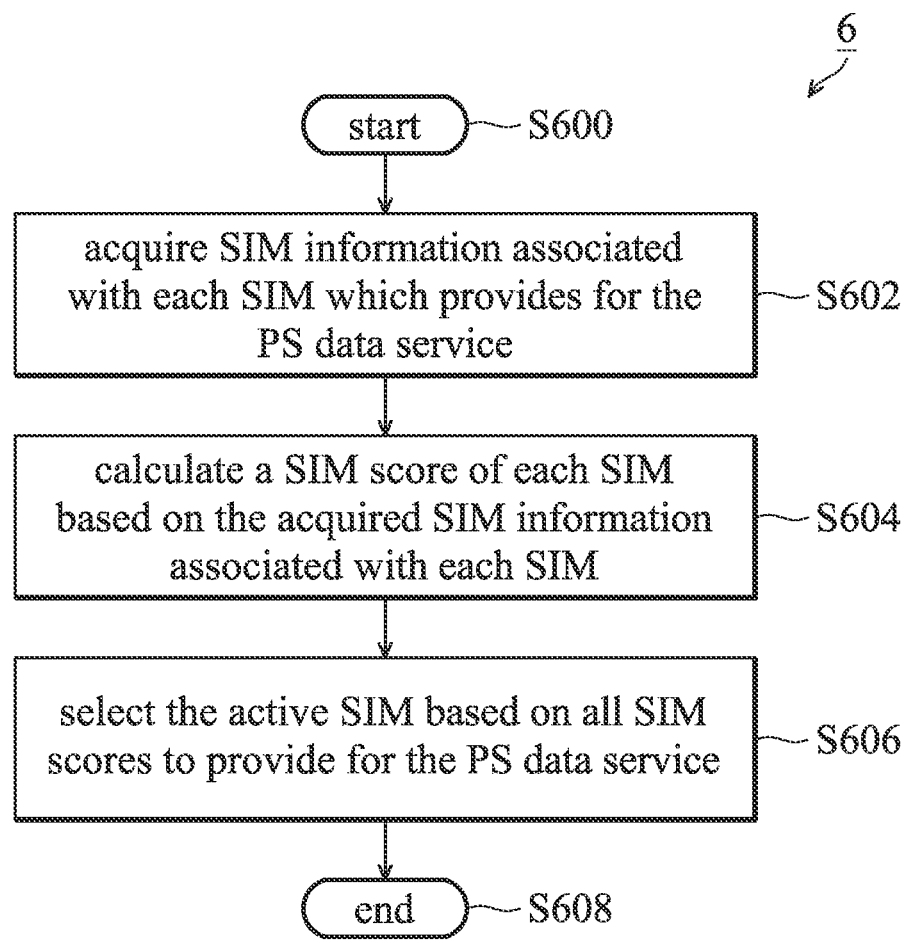
FIG. 6 is a flowchart of an automatic SIM selection method 6 according to another embodiment of the invention.

FIG. 6 is a flowchart of an automatic SIM selection method 6 according to another embodiment of the invention, adopted by the wireless device 10 in FIG. 2 to select an SIM from a plurality of SIMs to provide PS data services. The automatic SIM selection method 6 may be launched when the wireless device 10 is out of service on the present active SIM(s).

Upon startup, the wireless device 10 is initialized for the automatic SIM selection (S600). The wireless device 10 is configured to acquire the SIM information associated with each SIM (S602). The SIM information may be collected regularly at the predefined time interval $T_A$, as explained in the SIM collection method 4 in FIG. 4. The SIM information may be a user specified constraint such as a SIM priority, a transmission quota, or an operating status such as enablement and disablement of each SIM, which may be configured by a user according to his or her network preference. The configuration of the user specified constraint is detailed in the auto-SIM configuration method 8 in FIG. 8. The SIM information may also be dynamic information associated with each SIM, including the RSSI, RSCP, Ec/N0, RX CQI, upload/download data speed, transmission grants, device SIM capability information, and cell broadcast information.

With the collected SIM information, the wireless device 10 can calculate the SIM score of each SIM (S604). The SIM scores may be computed regularly at the predefined time interval $T_B$, as explained in the SIM selection method 5 in FIG. 5. The predefined time interval $T_B$ exceeds or equals the predefined time interval $T_A$. In some embodiments, the wireless device 10 may compute one SIM score for each SIM based on the acquired SIM information, representing how suitable the SIM is for obtaining the PS data service. In other embodiments, the wireless device 10 can separately calculate an active SIM score and an inactive SIM score for each SIM, respectively representing measures on how suitable and how unsuitable the SIM card is for use in the PS data services. The wireless device 10 may adopt different criteria and formulas for computing the active SIM score and inactive SIM score, such that once a SIM is selected as an active SIM, there is an increased difficulty in deselecting it, thereby reducing the switching frequency of the active SIM, and providing increased efficiency and increased stability in the PS data transfer.

Next, the wireless device 10 is configured to select the active SIM based on all SIM scores (S606). The selection and deselection of the active SIM are further detailed in the SIM selection method 7 in FIG. 7. In the case of Dual-SIM Dual Standby, because there can be only one SIM serving to provide the PS data service at a time, the wireless device 10 is configured to select one SIM which has a highest SIM score among all SIM scores, or one has a highest active SIM score among all active SIM scores, to serve as the active SIM. In the case of Dual-SIM Full Active, because more than one SIM can be used to provide the PS data service, the wireless device 10 is configured to compare all SIM scores with an active SIM threshold $Th_{act}$, and select all SIM(s) having the SIM score(s) or the active SIM score(s) exceeding the active SIM threshold $Th_{act}$ to serve as the active SIM(s). In some embodiments, the wireless device 10 is further configured to deselect the active SIM when the inactive SIM score thereof is less than an inactive SIM threshold $Th_{inact}$, or when the SIM score thereof is less than an inactive SIM threshold $Th_{inact}$. The active SIM threshold $Th_{act}$ may exceed the inactive SIM threshold $Th_{inact}$.

Having the active SIM being selected, the wireless device 10 can perform the PS data transfer on the selected active SIM. The automatic SIM selection method 6 is thus completed and exited (S608).

The automatic SIM selection method 6 in FIG. 6 allows the wireless device 10 to automatically select an active SIM according to the SIM information of the SIMs, providing an increased user experience in the PS data service while being able to boost the data speed of the PS data service.

Figure 7:
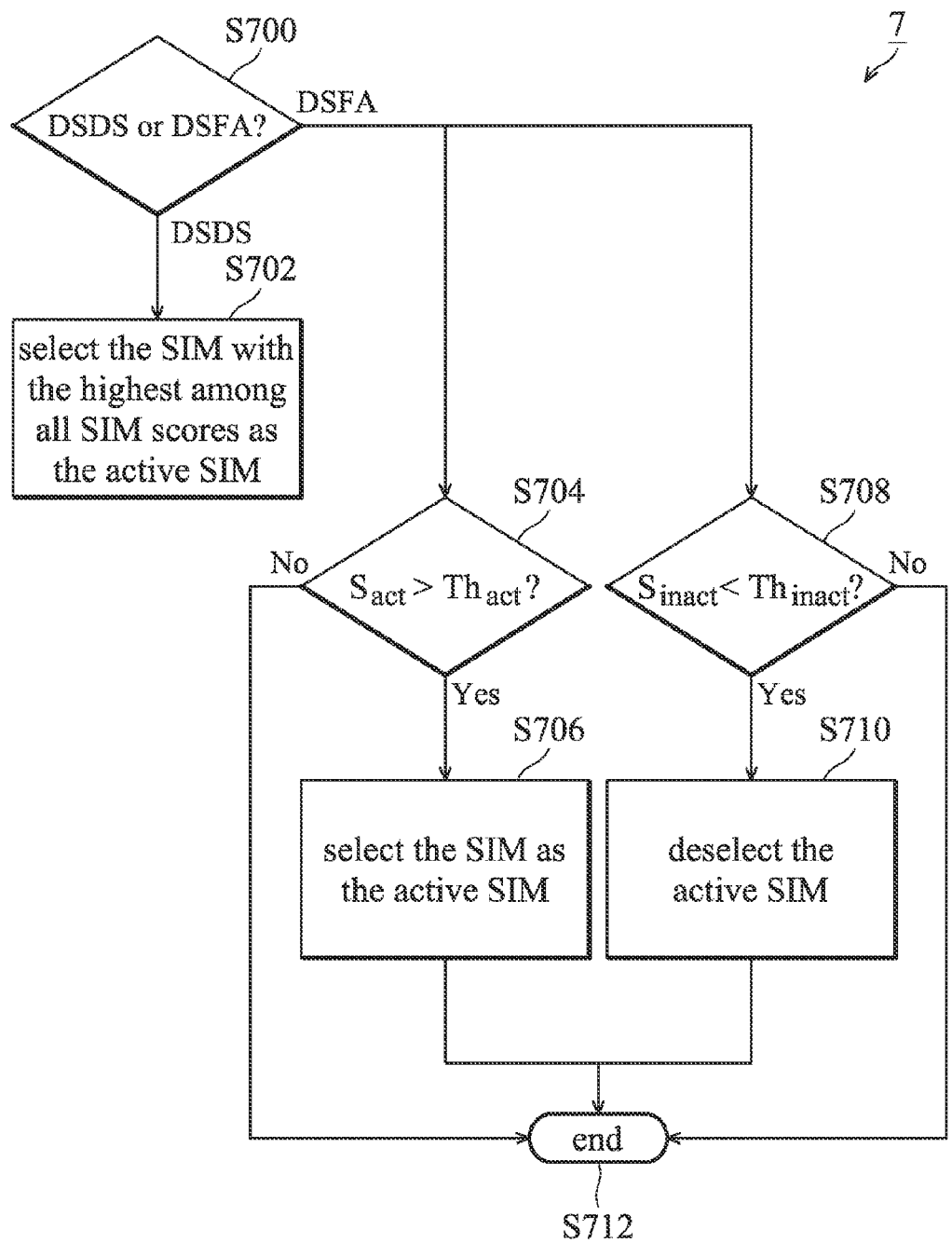
FIG. 7 is a flowchart of a detailed implementation for Step S606 in FIG. 6 according to an embodiment of the invention.

FIG. 7 is a flowchart of a detailed implementation for Step S606 in FIG. 6 according to an embodiment of the invention, adopted by the wireless device 10 in FIG. 2.

Upon startup, the wireless device 10 is configured to determine whether it is operated in the Dual-SIM Dual Standby or Dual-SIM Full Active mode (S700). When the wireless device is operated in the Dual-SIM Dual Standby mode, the wireless device 10 is configured to compare all SIM scores, and choose the SIM with the highest SIM score among all SIM scores as the active SIM (S702).

When the wireless device is operated in the Dual-SIM Full Active mode, the wireless device 10 is configured to compare all active SIM scores $S_{act}$ with the active SIM threshold $Th_{act}$ (704) and all inactive SIM scores $S_{inact}$ with the inactive SIM threshold $Th_{inact}$ (706). The active SIM threshold $Th_{act}$ represents an acceptable level for accepting the SIM card as the active SIM. The active SIM threshold $Th_{act}$ represents an unacceptable level for accepting the SIM card as the active SIM. The inactive SIM threshold $T_{inact}$ may be less than the active SIM threshold $Th_{act}$.

When the active SIM score $S_{act}$ exceeds or equals the active SIM threshold $Th_{act}$, the wireless device 10 finds the SIM is acceptable for providing the PS data service, thus selects the SIM as the active SIM (S706). Then the SIM selection method 7 exits (S712). Otherwise, when the active SIM score $S_{act}$ is less than the active SIM threshold $Th_{act}$, the wireless device 10 determines the SIM is unacceptable for providing the PS data service, thus the SIM selection method 7 jumps to Step S712 and exits.

When the inactive SIM score $S_{inact}$ is less than the inactive SIM threshold $Th_{inact}$, the wireless device 10 finds the SIM is unacceptable for providing the PS data service, thus deselects the SIM (S710). Then the SIM selection method 7 exits (S712). Otherwise, when the inactive SIM score $S_{inact}$ exceeds or equals the inactive SIM threshold $Th_{inact}$, the wireless device 10 will do nothing to the active status of the SIM, and the SIM selection method 7 jumps to Step S712 for exiting.

Figure 8:
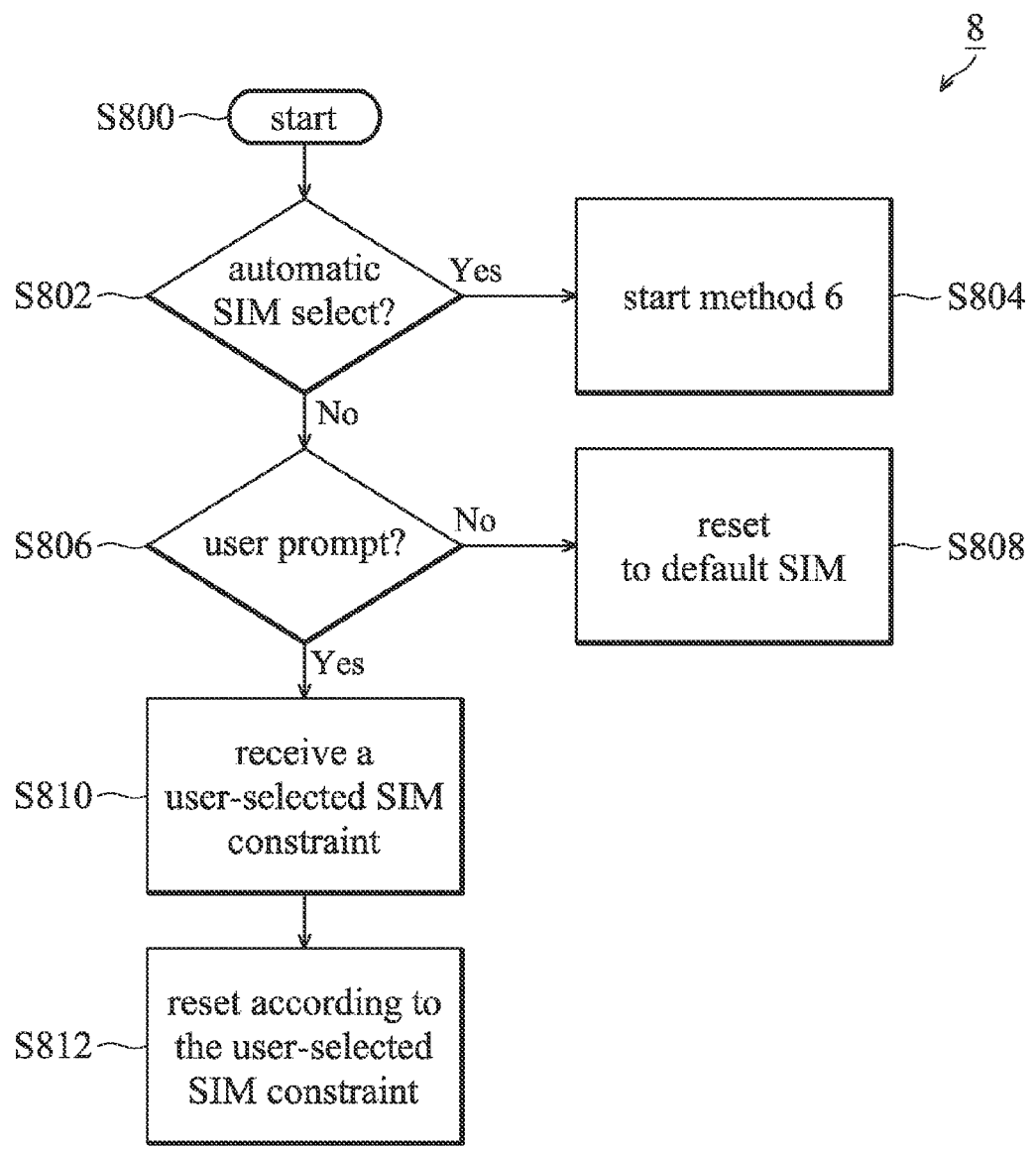
FIG. 8 is a flowchart of an SIM configuration method 8 according to an embodiment of the invention.

FIG. 8 is a flowchart of an SIM configuration method 8 according to an embodiment of the invention, adopted by the wireless device 10 in FIG. 2.

Upon startup (S800), the wireless device 10 is configured to determine whether the automatic SIM select option is turned on (S802). If so, the SIM configuration method 8 exits and proceeds with the automatic SIM selection method 6 in FIG. 6 (S804).

When the automatic SIM select option is off, the wireless device 10 is then configured to determine whether the user prompt option is turned on (S806). When the user prompt option is not turned on, users are not allowed to change the SIM configuration, therefore the wireless device 10 is configured to reset the system and load a default SIM configuration such as one shown below:

TABLE 1

| Default active SIM | SIM 1 | SIM 2 | ... | SIM N |
| Quota | X MB | No Limit |

In Table 1, the default SIM configuration shows the wireless device 10 has SIM cards SIM 1, SIM 2, through SIM N, the first SIM card SIM 1 has a bandwidth cap or a transmission quota of X MB, and the other SIM cards SIM 2 through SIM N do not have a bandwidth cap and can transfer as much data as required.

When the user prompt option is on, users are allowed to change the SIM configuration, thus the wireless device 10 is configured to prompt a SIM configuration menu such as an exemplary SIM configuration menu shown below:

TABLE 2

| SIM ID | Priority | Quota |
|---|---|---|
| SIM 1 | Priority X | Disable | A MB |
| SIM 2 | Priority Y | Disable | B MB |
| ... | ... | ... |

The users may change the SIM configuration by selecting a field in Table 2 and enter a preferred setting in the selected field. Table 2 shows the wireless device 10 contains SIM 1 and SIM 2, and for each SIM, the users can configure the priority, the operating status as being disable or enable, and the bandwidth cap limit thereof.

When the users enter a preferred setting to the selected field, the wireless device 10 can receive a corresponding user selected SIM constraint (S810), record the user selected SIM constraint into the SIM configuration and restart the automatic SIM selection using the updated SIM configuration (S812).

The SIM configuration method 8 is then completed and exited.

Figure 9:
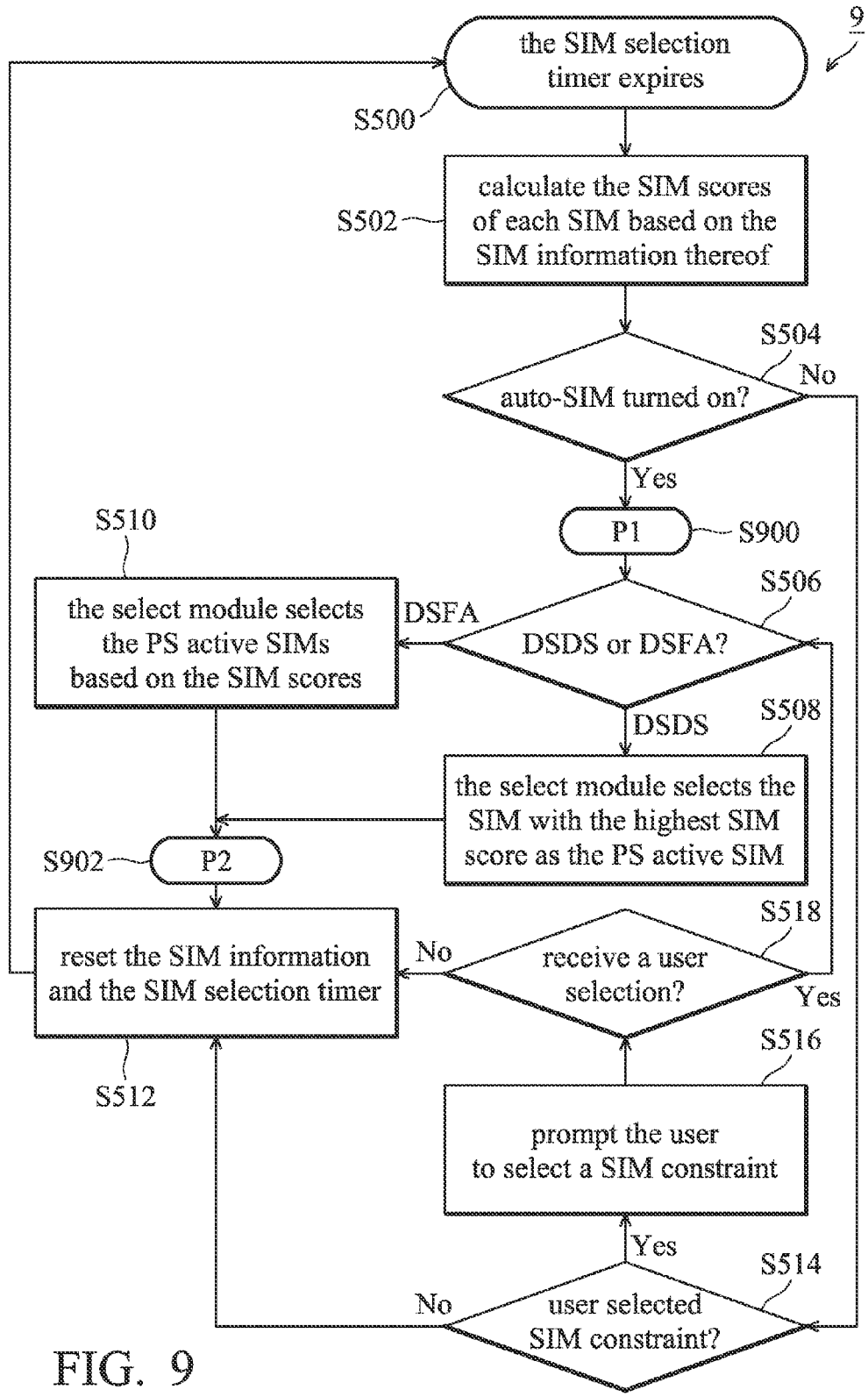
FIG. 9 is a flowchart of an automatic SIM selection method 9 according to another embodiment of the invention.

FIG. 9 is a flowchart of an automatic SIM selection method 9 according to another embodiment of the invention. The automatic SIM selection method 9 is similar to the automatic SIM selection method 6 except Step S900 is inserted before Step S506 and Step S902 is inserted after Steps S510 and S508. The automatic SIM selection steps S506, S508, and 510 between Steps S900 and S902 may be further embodied by methods 10B and 11B in FIGS. 10B and 11B, in which the method 10B illustrates a data upload method and the method 11B illustrates a data download method, as detailed below.

Figure 10A:
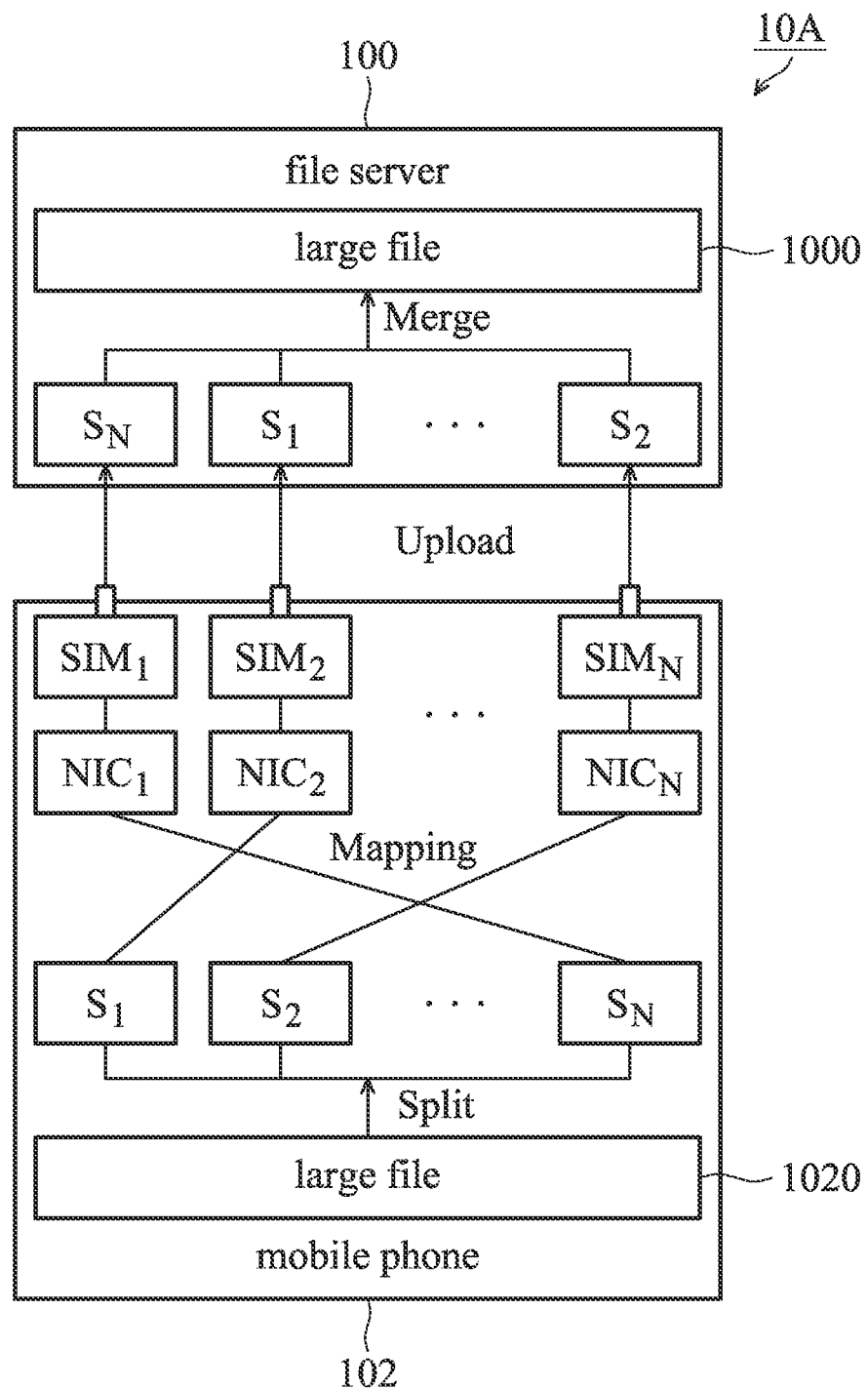
FIG. 10A is a schematic diagram of a communication system 10A where a data upload takes place according to an embodiment of the invention.

FIG. 10A is a schematic diagram of a communications system 10A where a data upload takes place according to an embodiment of the invention. The communication system 10A employs a file server 100 (data receiver) and a mobile phone 102 (data sender/multi-SIM wireless device) to illustrate the data upload operation.

The mobile phone 102 contains a plurality of SIM cards $SIM_1$ through $SIM_N$, and is configured to upload a large file 1020 to the file server 100 through the SIM cards $SIM_1$, $SIM_2$, through $SIM_N$. The mobile phone 102 can select the $SIM_1$ through $SIM_N$ as being active based on the collected SIM information. When the mobile phone 102 engages the SIM cards $SIM_1$ through $SIM_N$ to upload the large file 1020, it may establish SIM connections on the active SIM cards $SIM_1$ through $SIM_N$, split or divide the large file 1020 into data sections $S_1$ through $S_N$, map the data sections $S_1$ through $S_N$ to the active SIM cards $SIM_1$ through $SIM_N$ via network interface controllers $NIC_1$ through $NIC_N$, and concurrently transfer the data sections $S_1$ through $S_N$ over the SIM connections.

At request of a data upload, the file server 100 may establish a plurality of SIM connections with the mobile phone 102, receive the data sections $S_1$ through $S_N$ on the SIM connections concurrently, and merge or recombine the data sections $S_1$ through $S_N$ into the large file 1000.

The communications system 10A allows the divided data sections $S_1$ through $S_N$ to be sent over the plurality of SIM connections concurrently, leading to an increase in the data bandwidth of the data uploading and a decrease in the data transfer duration.

Figure 10B:
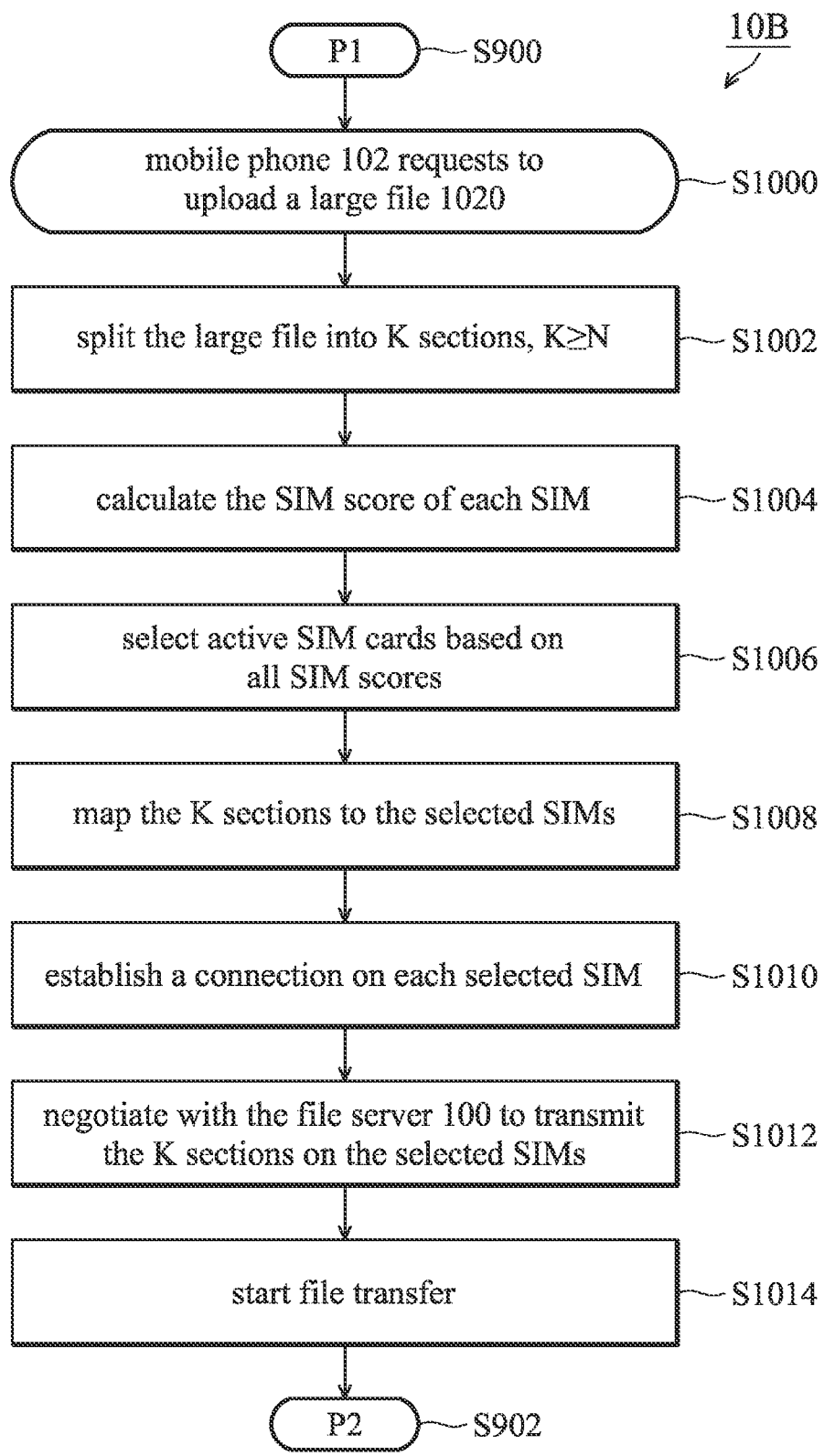
FIG. 10B is a flowchart of a data upload method 10B according to an embodiment of the invention.

FIG. 10B is a flowchart of a data upload method 10B according to an embodiment of the invention, incorporating the communication system 10A in FIG. 10A.

The data upload method 10B is initiated upon entering Step S900 and leaves at Step S902 in FIG. 9. Upon startup of the data upload method 10B, the mobile phone 102 requests to upload a large file 1020 to the file server 100 (S1000), and split the large file 1020 into K data sections, with K being exceeding or equal to N and N is the number of the SIM cards that are active on the mobile phone 102 (S1002).

The mobile phone 102 is configured to calculate the SIM score of each SIM based on the SIM information associated therewith (S1004), and select the active SIMs based on all SIM scores (S1006). In some embodiments, the mobile phone 102 may select the SIMs with SIM scores exceeding a predefined SIM threshold as the active SIMs.

After the active SIMs are selected, the mobile phone 102 is configured to map the K data sections to the selected active SIMs (S1008), and establish a SIM connection on each active SIM (S1010).

Having the SIM connections being established for all active SIMs, the mobile phone 102 is then configured to negotiate with the file server 100 for transmitting the K data sections on the established SIM connections (S1012), and start to send the K data sections simultaneously over the established SIM connections (S1014).

After the data transfer for all data sections are completed, the data upload method 10B is completed and exited at Step S902 in FIG. 9.

The data upload method 10B allows the split data sections be sent over the plurality of SIM connections simultaneously, resulting in an increase in the data bandwidth of the data uploading and a decrease in the data transfer duration.

Figure 11A:
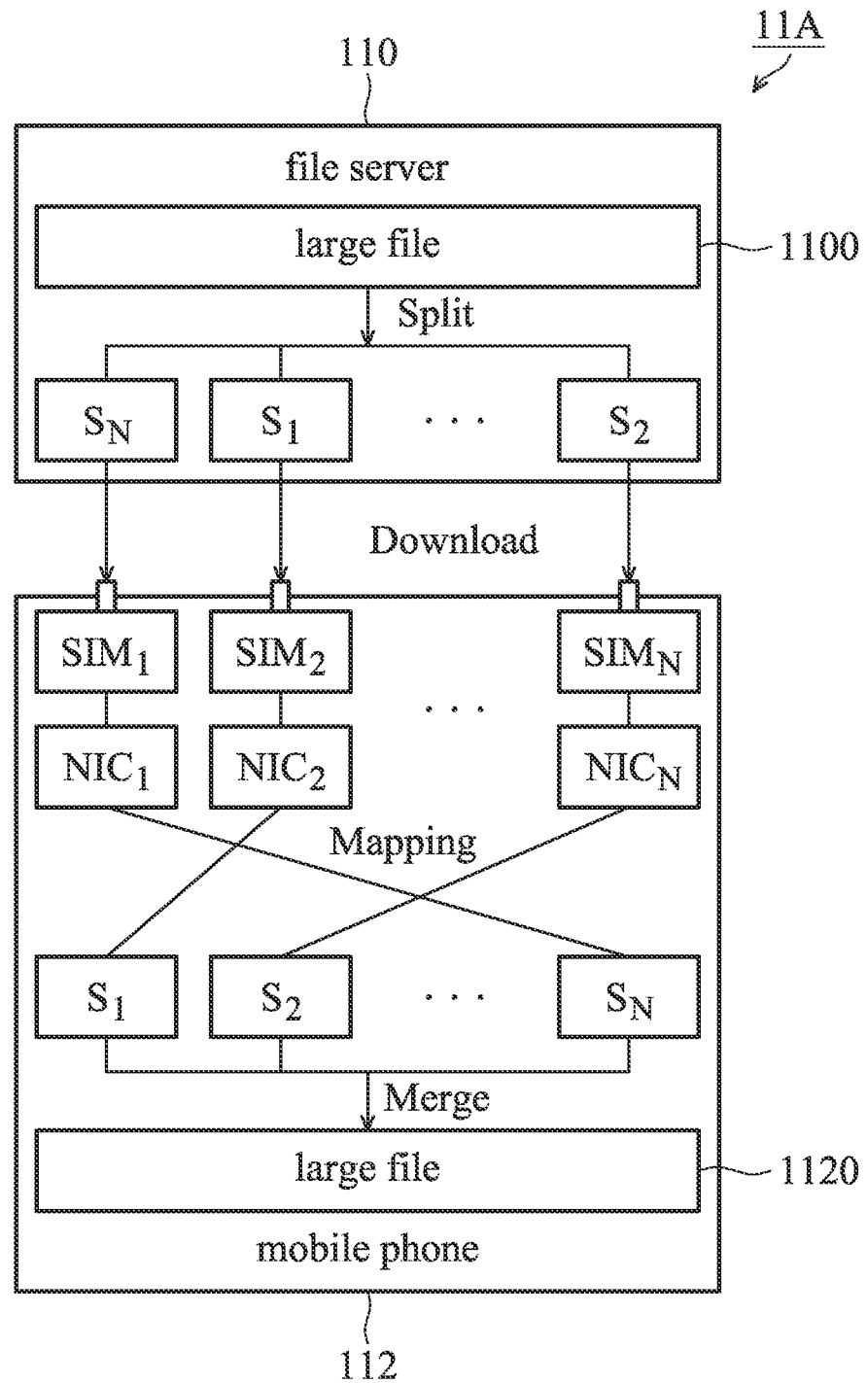
FIG. 11A is a schematic diagram of a communication system 11A where a data download takes place according to an embodiment of the invention.

FIG. 11A is a schematic diagram of a communications system 11A where a data download takes place according to an embodiment of the invention. The communications system 11A includes a file server 110 (data sender) and a mobile phone 112 (data receiver/multi-SIM wireless device).

The mobile phone 112 contains a plurality of SIM cards $SIM_1$, $SIM_2$ through $SIM_N$ and a corresponding number of network interface controllers $NIC_1$ through $NIC_N$, and is configured to download a large file 1100 from the file server 110 through the SIM cards $SIM_1$ through $SIM_N$. The mobile phone 112 can select the $SIM_1$ through $SIM_N$ as being active based on the collected SIM information. When the mobile phone 112 engages the SIM cards $SIM_1$ through $SIM_N$ to download the large file 1100, it may establish SIM connections on the active SIM cards $SIM_1$ through $SIM_N$, obtain file information on the large file 1100 from the file server 110 and split the large file 1100 into data sections $S_1$ through $S_N$ according to the file information, map the data sections $S_1$ through $S_N$ to the active SIM cards $SIM_1$ through $SIM_N$ via the network interface controller $NIC_1$ through $NIC_N$, inform the file server 110 of the mapping of the data sections to be download and the SIM connections, and then concurrently download the data sections $S_1$ through $S_N$ over the SIM connections. After the data download for all data sections $S_1$ through $S_N$ are completed, the mobile phone 112 can merge or recombine the downloaded data sections $S_1$ through $S_N$ to a single file 1120, completing the data download procedure.

At the file server 110, upon receiving a request for a data download from the mobile phone 112, a plurality of SIM connections are established with the mobile phone 112. The file server 110 can send the file information of the requested file download to the mobile phone 112, and receive mapping information on how the data sections $S_1$ through $S_N$ are mapped with the established SIM connections. Subsequently, the file server 110 can split the requested file 1100 into the data sections $S_1$ through $S_N$ and transmit the data sections $S_1$ through $S_N$ concurrently on the SIM connections according to the mapping information.

The communications system 11A allows the divided data sections $S_1$ through $S_N$ to be sent over the plurality of SIM connections concurrently, leading to an increase in the data bandwidth of the data uploading and a decrease in the data transfer duration.

Figure 11B:
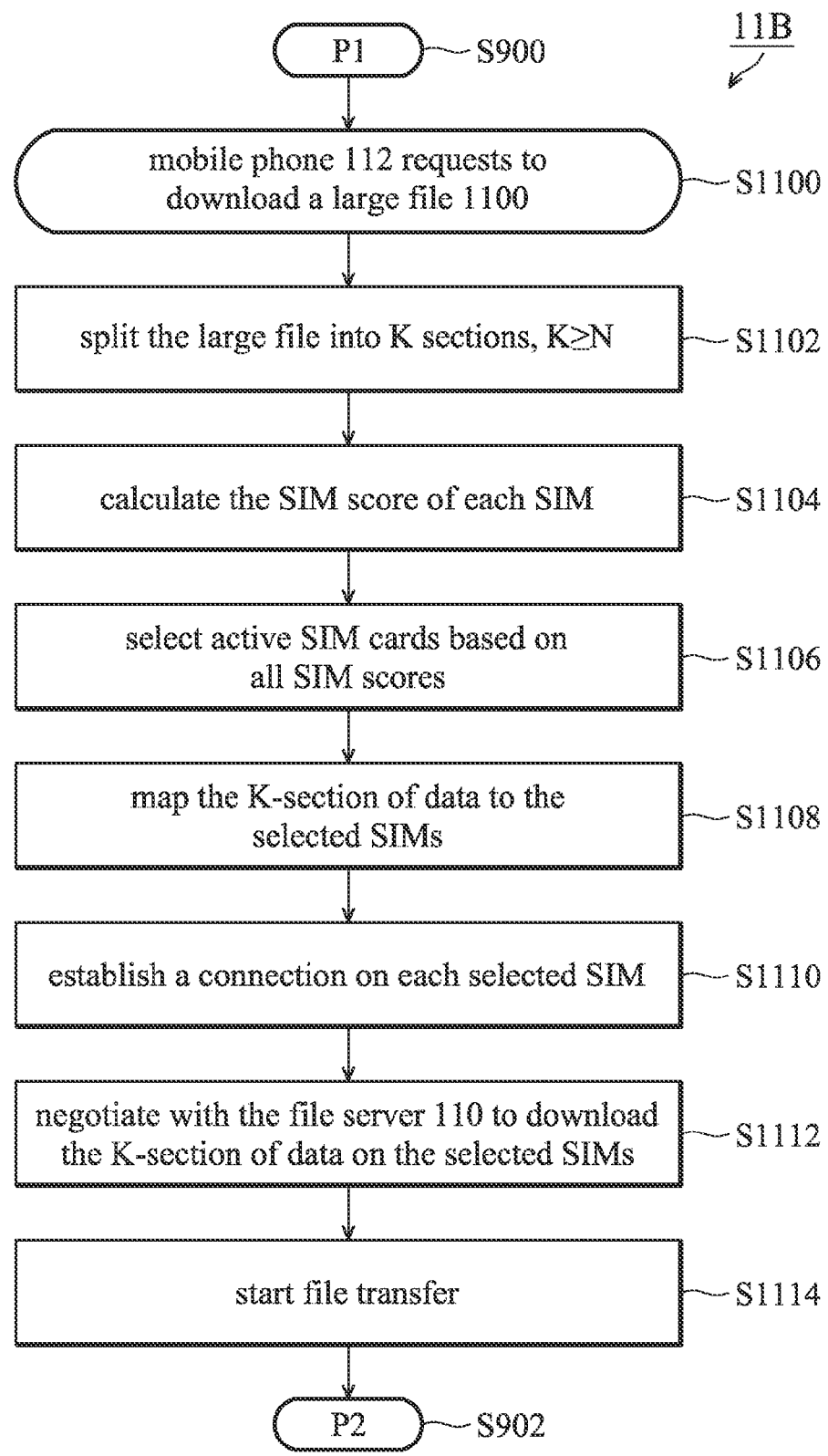
FIG. 11B is a flowchart of a data download method 11B according to an embodiment of the invention.

FIG. 11B is a flowchart of a data download method 11B according to an embodiment of the invention, incorporating the communications system 11A in FIG. 11A.

The data download method 11B is initiated upon entering Step S900 and leaves at Step S902 in FIG. 9. Upon startup of the data download method 11B, the mobile phone 112 sends a request for downloading a large file 1100 to the file server 110 (S1100), and obtains file information on the large file 1100 from the file server 110. After receiving the file information the mobile phone 112 can split the large file 1100 into K data sections, with K being exceeding or equal to N and N is the number of the SIM cards that are active on the mobile phone 112 (S1102).

The mobile phone 112 is configured to calculate the SIM score of each SIM based on the SIM information associated therewith (S1104), and select the active SIMs based on all SIM scores (S1106). In some embodiments, the mobile phone 112 may select the SIMs with SIM scores exceeding a predefined SIM threshold as the active SIMs.

After the active SIMs are selected, the mobile phone 112 is configured to map the K data sections to the selected active SIMs (S1108), and establish a SIM connection on each active SIM (S1110).

Having the SIM connections being established for all active SIMs, the mobile phone 112 is then configured to negotiate with the file server 110 for downloading the K data sections on the established SIM connections (S1112). The negotiation may include the mapping of the data sections to be downloaded and the SIM connections. After the negotiation is completed, the file server 110 can start sending the K data sections simultaneously over the established SIM connections to the mobile phone 112 (S1114). The K data sections are received and merged into a single file at the mobile phone 112.

After the data transfer for all data sections are completed, the data download method 11B is completed and exited at Step S902 in FIG. 9.

The data download method 11B allows the split data sections be sent over the plurality of SIM connections simultaneously, resulting in an increase in the data bandwidth of the data uploading and a decrease in the data transfer duration.

Figure 12:
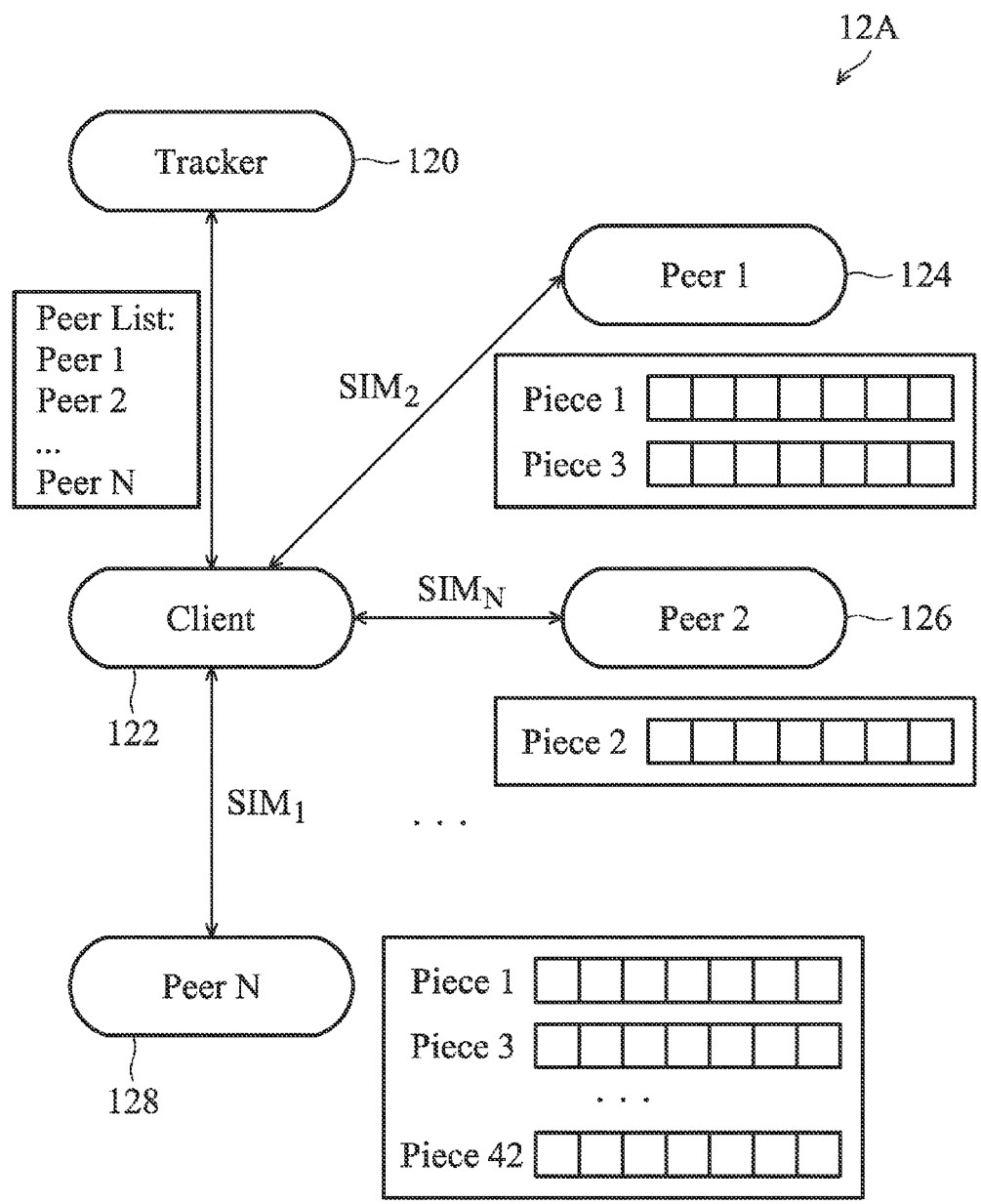
FIG. 12A is a schematic diagram of a data download system 12A according to an embodiment of the invention.
FIG. 12B shows a schematic diagram of a mobile phone 122 according to an embodiment of the invention.
Figure 12:
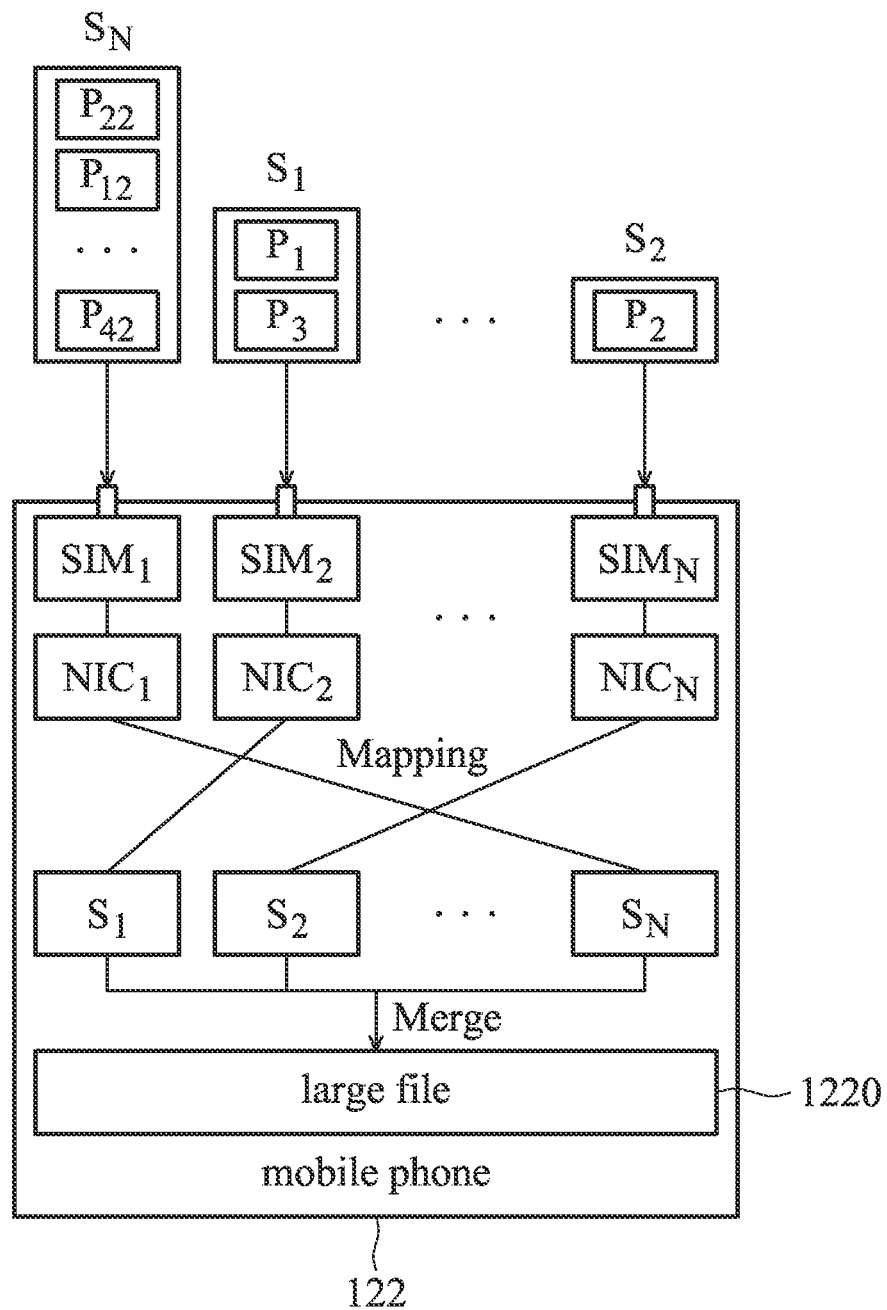

FIG. 12A is a schematic diagram of a data download system 12A according to an embodiment of the invention, for performing a multi-thread download such as a BitTorrent download. The data download system 12A contains a client device 122, a tracker device 120, and peer devices 124, 126, and 128. The client device 122 is a multi-SIM device containing multiple SIM cards, and has the capability of multi-SIM Full Active, i.e., transferring data concurrently on more than one SIM. When the client device 122 would like perform a BitTorrent download, it may break the downloaded into parts and download each part on different SIMs.

At request of a file download, the client device 122 can obtain file information on the requested file, which includes a tracker address of the tracker device 120. The client device 122 can then split the file into pieces 1 through 42, and obtain a peer list on the peer devices from the tracker device 120. With the peer list, the client device 122 knows that the peer devices 124, 126, and 128, each holds a portion of data of the requested file.

The client device 122 can identify the peer device(s) that contain the requested file and the data pieces they hold according to the peer list, and establish SIM connections $SIM_1$, $SIM_2$, and $SIM_N$ with 3 active SIM cards (not shown) to the peer devices 124, 126, and 128, respectively. The client device 122 can further map the split data pieces to each active SIM card, and download the data pieces from the peer devices 124, 126, and 128 over the SIM connections $SIM_1$, $SIM_2$, and $SIM_N$, concurrently. For example, the client device 122 may determine that the peer device 124 contains the data pieces 1 and 3, the peer device 126 contains the data piece 2, the peer device 128 contains the data pieces 1, 3, through pieces 42, map the data pieces 4 through 42 to the first SIM which connects to the peer device 128, the data piece 2 to the third SIM which connects to the peer device 126, and the data pieces 1 and 3 to the second SIM which connects to the peer device 124.

The client device 122 can negotiate with the peer devices 124, 126 and 128 by sending them the mapping information on which data pieces they are expected to transfer, and perform the data download concurrently.

After all data pieces are received, the client device 122 can merge all data pieces into 1 single file.

FIG. 12B shows a schematic diagram of a mobile phone 122 according to an embodiment of the invention, incorporating the data download system 12A in FIG. 12A.

The mobile phone 122 may be the client device 122 in FIG. 12A, containing a plurality of SIM cards, and requesting for a BitTorrent download. When the mobile phone 122 requests to download a BitTorrent file, it may calculate a SIM score for each SIM based on SIM information thereof, and select one or more active SIMs according to the SIM scores, break the requested file into data pieces, and map the data pieces to the active SIMs. For example, the embodiment shows SIM cards $SIM_1$, $SIM_2$, and $SIM_N$ are selected as active SIMs, and the data pieces P22, P12 and P42 are mapped to the SIM card $SIM_1$, the data pieces P1 and P3 are mapped to the SIM card $SIM_2$, and the data piece P2 is mapped to the SIM card $SIM_N$.

The mobile phone 122 can obtain a peer list from a tracker device (not shown), and establish SIM connections with the peer devices (not shown) on the peer list using the active SIMs, transmit map information on the requested data pieces to the peer devices, and download the requested data pieces from the peer devices according to the map information. After all data pieces are collected, the mobile phone 122 can combine all data pieces together to form one large file 1220.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The term "or" used herein is intended to mean an inclusive "or" rather than an exclusive "or." That is, unless specified otherwise, or clear from the context, the phrase "X employs A or B" is intended to mean any of the natural inclusive permutations. In addition, the articles "a" and "an" as used in this application and the appended claims should generally be construed to mean "one or more" unless specified otherwise or clear from the context to be directed to a singular form.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a wireless device to select an active subscriber identity module (SIM) from a plurality of SIMs which provide for packet switched (PS) data services, the method comprising:
    acquiring SIM information associated with each SIM which provides for the PS data service;
    calculating a SIM score of each SIM based on the acquired SIM information associated with each SIM; and
    selecting the active SIM based on all SIM scores to provide for the PS data service,
    wherein the SIM score is determined according to a priority assigned to the SIM and a data speed corresponding to the SIM,
    wherein the SIM score comprises an active SIM score and an inactive SIM score,
    wherein the active score is determined according to the priority assigned to the SIM, and a sum of a highest data speed corresponding to the SIM and a current data speed of the SIM, and the inactive SIM score is determined according to the priority assigned to the SIM, and the highest data corresponding to the SIM.

2. The method of claim 1, wherein the selecting the active SIM step comprises:
    selecting the active SIM which has the highest SIM score among all SIM scores to provide for the PS data service.

3. The method of claim 1, wherein the selecting the active SIM step comprises:
    selecting the active SIM which has a corresponding SIM score exceeding a first score threshold to provide for the PS data service.

4. The method of claim 1, further comprising:
    selecting an inactive SIM which has a corresponding SIM score less than a first score threshold.

5. The method of claim 1, wherein the selecting the active SIM step is performed in a selection period that exceeds an information acquisition period of performing the acquiring SIM information step.

6. The method of claim 1, wherein the SIM information is media access control (MAC) data.

7. The method of claim 1, wherein the acquiring the SIM information step comprises:
    acquiring a channel condition of a PS service network associated with each SIM.

8. The method of claim 1, wherein the acquiring the SIM information step comprises:
    acquiring a channel resource which a PS service network allocates to each associated SIM.

9. The method of claim 1, wherein the acquiring the SIM information step comprises:
    acquiring a supported functionality of the wireless device and a PS service network associated with each SIM.

10. The method of claim 1, further comprises:
    splitting a transfer file; and
    mapping the split transfer file to the selected active SIM.

11. A wireless device, selecting an active subscriber identity module (SIM) from a plurality of SIMs which provide for packet switched (PS) data services, comprising:
    the plurality of SIMs;
    a modem circuit, configured to acquire SIM information associated with each SIM which provides for the PS data service; and
    a select circuit, configured to calculate a SIM score determined according to a priority assigned to the SIM and a data speed corresponding to the SIM,
    wherein the SIM score comprises an active SIM score and an inactive SIM score,
    wherein the active score is determined according to the priority assigned to the SIM, and a sum of a highest data speed corresponding to the SIM and a current data speed of the SIM, and the inactive SIM score is determined according to the priority assigned to the SIM, and the highest data corresponding to the SIM.

12. The wireless device of claim 11, wherein the select circuit is configured to select the active SIM which has the highest SIM score among all SIM scores to provide for the PS data service.

13. The wireless device of claim 11, wherein the select circuit is configured to select the active SIM which has a corresponding SIM score exceeding a first score threshold to provide for the PS data service.

14. The wireless device of claim 11, wherein the select circuit is configured to select an inactive SIM which has a corresponding SIM score less than a first score threshold.

15. The wireless device of claim 11, wherein the select circuit is configured to select the active SIM in a selection period which exceeds an information acquisition period of performing the acquiring SIM information step.

16. The wireless device of claim 11, wherein the SIM information is media access control (MAC) data.

17. The wireless device of claim 11, wherein the modem circuit is configured to acquire a channel condition of a PS service network associated with each SIM.

18. The wireless device of claim 11, wherein the modem circuit is configured to acquire a channel resource which a PS service network allocates to each associated SIM.

19. The wireless device of claim 11, wherein the modem circuit is configured to acquire a supported functionality of the wireless device and a PS service network associated with each SIM.

20. The wireless device of claim 11, wherein the select circuit is configured to split a transfer file; and map the split transfer file to the selected active SIM.

* * * * *